United States Patent
Yoshikawa et al.

(10) Patent No.: US 9,394,413 B2
(45) Date of Patent: Jul. 19, 2016

(54) RESIN PARTICLE AND METHOD FOR PRODUCING THE SAME

(71) Applicant: FUJI XEROX CO., LTD., Tokyo (JP)

(72) Inventors: Hideaki Yoshikawa, Kanagawa (JP); Yuka Zenitani, Kanagawa (JP); Hiroyoshi Okuno, Kanagawa (JP); Shunsuke Nozaki, Kanagawa (JP); Shinichiro Kawashima, Kanagawa (JP); Sakae Takeuchi, Kanagawa (JP); Yasuo Kadokura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 76 days.

(21) Appl. No.: 14/264,987

(22) Filed: Apr. 29, 2014

(65) Prior Publication Data

US 2014/0234626 A1    Aug. 21, 2014

Related U.S. Application Data

(62) Division of application No. 13/214,816, filed on Aug. 22, 2011, now abandoned.

(30) Foreign Application Priority Data

Jan. 19, 2011    (JP) .................................. 2011-008842

(51) Int. Cl.
*C08J 3/12* (2006.01)
*G03G 9/08* (2006.01)
*G03G 9/097* (2006.01)

(52) U.S. Cl.
CPC .............. *C08J 3/128* (2013.01); *G03G 9/0804* (2013.01); *G03G 9/0806* (2013.01); *G03G 9/0819* (2013.01); *G03G 9/0827* (2013.01); *G03G 9/09716* (2013.01); *G03G 9/09725* (2013.01); *C08J 2325/06* (2013.01); *C08J 2367/03* (2013.01); *C08J 2375/04* (2013.01); *Y10T 428/2993* (2015.01); *Y10T 428/2996* (2015.01)

(58) Field of Classification Search
None
See application file for complete search history.

(56) References Cited

U.S. PATENT DOCUMENTS

| | | |
|---|---|---|
| 4,775,520 A | 10/1988 | Unger |
| 4,902,598 A | 2/1990 | Winnik et al. |
| 4,911,903 A | 3/1990 | Unger et al. |
| 5,221,497 A | 6/1993 | Watanabe et al. |
| 5,597,512 A | 1/1997 | Watanabe et al. |
| 5,609,675 A | 3/1997 | Noritake et al. |
| 5,674,589 A | 10/1997 | Bennett et al. |
| 5,985,229 A | 11/1999 | Yamada et al. |
| 5,998,329 A | 12/1999 | Derolf et al. |
| 6,296,996 B1 | 10/2001 | Ogawa et al. |
| 6,403,271 B1 | 6/2002 | Suzuki et al. |
| 6,811,944 B2 | 11/2004 | Higuchi et al. |
| 6,875,549 B2 | 4/2005 | Yamazaki et al. |
| 7,846,632 B2 | 12/2010 | Nakatani |
| 2002/0115009 A1* | 8/2002 | Takagi .................. G03G 9/0819 430/110.3 |
| 2003/0148203 A1* | 8/2003 | Suzuki ................. G03G 9/0827 430/110.3 |
| 2004/0067189 A1 | 4/2004 | Sugiura et al. |
| 2004/0137353 A1 | 7/2004 | Iida et al. |
| 2004/0222618 A1 | 11/2004 | Azechi et al. |
| 2005/0214671 A1* | 9/2005 | Mizutani .............. G03G 9/0819 430/111.35 |
| 2007/0020543 A1 | 1/2007 | Nakatani |
| 2007/0218387 A1 | 9/2007 | Ishii et al. |
| 2008/0086951 A1 | 4/2008 | Wakamiya et al. |
| 2008/0268362 A1 | 10/2008 | Kudo |
| 2009/0196658 A1 | 8/2009 | Sugiura |
| 2010/0104323 A1 | 4/2010 | Toizumi et al. |
| 2010/0203443 A1 | 8/2010 | Okita et al. |
| 2010/0233605 A1* | 9/2010 | Iida ....................... G03G 9/0872 430/105 |
| 2010/0247148 A1* | 9/2010 | Haruyama ......... G03G 5/14765 399/159 |
| 2010/0330488 A1 | 12/2010 | Ieda |
| 2011/0209413 A1 | 9/2011 | Nishida et al. |
| 2011/0318581 A1 | 12/2011 | Zenitani et al. |
| 2011/0318584 A1 | 12/2011 | Yoshikawa et al. |
| 2012/0183777 A1 | 7/2012 | Yoshikawa et al. |

FOREIGN PATENT DOCUMENTS

| | | |
|---|---|---|
| CN | 86106689 A | 5/1987 |
| CN | 1202710 A | 12/1998 |
| CN | 1380585 A | 11/2002 |
| CN | 101271287 A | 9/2008 |
| CN | 101807019 A | 8/2010 |
| CN | 102295292 A | 12/2011 |
| EP | 0 574 642 A1 | 12/1993 |
| JP | A-62-52119 | 3/1987 |
| JP | A-63-310714 | 12/1988 |

(Continued)

OTHER PUBLICATIONS

Dec. 5, 2014 Office Action issued in U.S. Appl. No. 12/917,814.

(Continued)

*Primary Examiner* — Erma Cameron
(74) *Attorney, Agent, or Firm* — Oliff PLC

(57) ABSTRACT

A resin particle having: a resin mother particle; and silica particles external added onto the surface of the resin mother particle, wherein a primary particles of the silica particles which have a volume average particle diameter of from 100 nm to 500 nm, a particle size distribution index of from 1.40 to 1.80 and an average circularity of from 0.5 to 0.85 has a regression line expressed by the following expression (1) with respect to the circularity and the volume average particle diameter (nm):

Circularity=α×(Volume average particle diameter)/1000+β    (1)

wherein α is from −2.5 to −0.9, and β is from 0.8 to 1.2.

16 Claims, No Drawings

(56) References Cited

FOREIGN PATENT DOCUMENTS

| | | |
|---|---|---|
| JP | A-1-317115 | 12/1989 |
| JP | A-4-187512 | 7/1992 |
| JP | A-4-238807 | 8/1992 |
| JP | A-04-255755 | 9/1992 |
| JP | A-5-4812 | 1/1993 |
| JP | A-06-041419 | 2/1994 |
| JP | A-6-254383 | 9/1994 |
| JP | A-7-118008 | 5/1995 |
| JP | A-7-277725 | 10/1995 |
| JP | A-8-12305 | 1/1996 |
| JP | A-08-283617 | 10/1996 |
| JP | A-09-143401 | 6/1997 |
| JP | A-9-202612 | 8/1997 |
| JP | A-11-060232 | 3/1999 |
| JP | A-11-286611 | 10/1999 |
| JP | A-2000-344512 | 12/2000 |
| JP | A-2001-150334 | 6/2001 |
| JP | A-2001-189009 | 7/2001 |
| JP | 2002-029730 A | 1/2002 |
| JP | A-2002-038049 | 2/2002 |
| JP | A-2002-146233 | 5/2002 |
| JP | A-2003-133267 | 5/2003 |
| JP | A-2003-165718 | 6/2003 |
| JP | A-2003-171117 | 6/2003 |
| JP | A-2004-035293 | 2/2004 |
| JP | A-2004-102236 | 4/2004 |
| JP | 2004-155648 A | 6/2004 |
| JP | A-2004-203638 | 7/2004 |
| JP | A-2006-028319 | 2/2006 |
| JP | A-2006-251220 | 9/2006 |
| JP | A-2007-22827 | 2/2007 |
| JP | A-2008-169102 | 7/2008 |
| JP | A-2008-174430 | 7/2008 |
| JP | A-2008-285406 | 11/2008 |
| JP | A-2009-078935 | 4/2009 |
| JP | A-2009-137791 | 6/2009 |
| JP | A-2009-149493 | 7/2009 |
| JP | A-2009-161371 | 7/2009 |
| JP | A-2009-186512 | 8/2009 |
| JP | A-2010-107601 | 5/2010 |
| JP | A-2011-185998 | 9/2011 |
| JP | 2012-006789 A | 1/2012 |
| WO | WO 2010/052945 A1 | 5/2010 |

OTHER PUBLICATIONS

Jan. 7, 2015 Office Action issued in U.S. Appl. No. 13/934,928.
Feb. 2, 2015 Office Action issued in Chinese Application No. 201110318138.2.
Feb. 10, 2015 Office Action issued in Chinese Application No. 201110318210.1.
Dec. 19, 2013 Office Action issued in Chinese Application No. 201010546805.8 (with English Translation).
Jan. 30, 2014 Office Action issued in U.S. Appl. No. 13/214,657.
Japanese Patent Office, Notice of Reasons for Rejection mailed Oct. 29, 2013 in Japanese Patent Application No. 2010-145221 w/English-language Translation.
Oct. 15, 2013 Office Action issued in Japanese Application No. 2010-143828 (with English Translation).
Kim et al., "Influence of reaction conditions on sol-precipitation process producing silicon oxide particles," Ceramics International, vol. 28 (2002), pp. 187-194.
Wang et al., "Preparation of spherical silica particles by Stöber process with high concentration of tetra-ethyl-orthosilicate," Journal of Colloid and Interface Science, vol. 341, pp. 23-29, available online Sep. 18, 2009.
Nagao et al., "Particle formation in the hydrolysis of tetraethyl orthosilicate in pH buffer solution," Journal of Colloid and Interface Science, vol. 279 (2004), pp. 143-149.
Jul. 19, 2013 Office Action issued in U.S. Appl. No. 13/214,657.
Mar. 14, 2013 Office Action issued in U.S. Appl. No. 12/912,057.
Mar. 20, 2013 Office Action issued in U.S. Appl. No. 12/917,814.
Sep. 17, 2012 Office Action issued in U.S. Appl. No. 12/917,814.
U.S. Appl. No. 12/912,057 in the name of Zenitani et al. filed Oct. 26, 2010.
U.S. Appl. No. 12/917,814 in the name of Yoshikawa et al. filed Nov. 2, 2010.
Oct. 23, 2012 Office Action issued in U.S. Appl. No. 12/912,057.
Sep. 10, 2012 Australian Office Action issued in Australian Patent Application No. 2011232772.
Apr. 12, 2012 Extended European Search Report issued in European Patent Application No. 11185668.8.
U.S. Appl. No. 13/214,657, filed in the name of Yuka Zenitani et al. on Aug. 22, 2011.
Jul. 2, 2015 Office Action issued in U.S. Appl. No. 13/934,928.
Aug. 20, 2014 Office Action issued in Chinese Application No. 201010546805.8 (with English Translation).
Aug. 28, 2014 Office Action issued in U.S. Appl. No. 13/670,040.
Other Document 1: Table to confirm that the oxide particles described in [Table 1] of [0265] of Publication 1 satisfy the formula (1) of Claim 1 of the present application (with English Translation).
Jul. 7, 2014 Information Offer Form issued in Japanese Application No. 2011-008842 (with English Translation).
Aug. 11, 2014 Notice of Information Offer issued in Japanese Patent Application No. 2011-010052 w/translation.
Dec. 15, 2015 Notification of Reasons for Refusal issued in Japanese Patent Application No. 2013-013268.

\* cited by examiner

RESIN PARTICLE AND METHOD FOR PRODUCING THE SAME

CROSS-REFERENCE TO RELATED APPLICATION(S)

This application is a divisional of application Ser. No. 13/214,816, filed Aug. 22, 2011, now abandoned, which in turn claims priority from Japanese Patent Application No. 2011-008842 filed on Jan. 19, 2011, the entire content of which is incorporated herein by reference.

BACKGROUND

1. Field

The present invention relates to a resin particle and a method for producing the same.

2. Description of the Related Art

Resin particles are used for toners, powder coating materials, binders of slush molding materials and the like. Here, for example, in order to enhance strength of the resin or fluidity of the powder or to suppress packing, there may be the case where it is contrive to allow silica particles to attach to a resin particle, thereby functionalizing the resin particle. It may be considered that such a function is easy to depend upon the shape or attached state of the silica particles as an external additive of the rein particle, and silica particles having various shapes and attached modes are proposed.

SUMMARY (1) A resin particle including: a resin mother particle; and silica particles external added onto a surface of the resin mother particle, wherein a primary particless of the silica particles which have a volume average particle diameter of from 100 nm to 500 nm, a particle size distribution index of from 1.40 to 1.80 and an average circularity of from 0.5 to 0.85, and satisfy a regression line expressed by a following expression (1) with respect to the circularity and the volume average particle diameter (nm):

$$\text{Circularity} = \alpha \times (\text{Volume average particle diameter})/1000 + \beta \quad (1)$$

wherein $\alpha$ is from $-2.5$ to $-0.9$, and $\beta$ is from 0.8 to 1.2.

DETAILED DESCRIPTION OF EXEMPLARY EMBODIMENTS

<Resin Particle>

The resin particle according to a first exemplary embodiment includes a resin mother particle and silica particles external added onto the surface of the resin mother particle, the silica particles being silica particles in which a primary particles thereof having a volume average particle diameter of from 100 nm to 500 nm, a particle size distribution index of from 1.40 to 1.80 and an average circularity of from 0.5 to 0.85 has a regression line expressed by the following expression (1) with respect to the circularity and the volume average particle diameter (nm)

$$\text{Circularity} = \alpha \times (\text{Volume average particle diameter})/1000 + \beta \quad (1)$$

In the expression (1), $\alpha$ is from $-2.5$ to $-0.9$ ($-2.5 \leq \alpha \leq -0.9$), and $\beta$ is from 0.8 to 1.2 ($0.8 \leq \beta \leq 1.2$).

The silica particles having the foregoing constitution, which are externally added onto the surface of the resin mother particle, is also referred to as a "specified silica particles". Also, when the "primary particles" is simply referred to, it means primary particles of the specified silica particles.

The "circularity" means a degree of a sphere of the specified silica particles, and when the circularity is 1, it is meant that the particle is a true sphere. The specified silica particles are one having such a shape that the primary particles have an average circularity of not more than 0.85 and that a large number of concaves and convexes are present as compared with a true sphere. The shape in which the circularity is not more than 0.85 is hereinafter sometimes referred to as a "heterogeneous shape", and the shape in which the circularity exceeds 0.85 is hereinafter sometimes referred to as a "spherical shape". That is, the shape of the specified silica particles is a heterogeneous shape.

When the resin particle according to the first exemplary embodiment is made a resin particle in which the specified silica particles attaches onto the surface of the resin mother particle, the resin particle keeps fluidity. Incidentally, the "resin mother particle" as referred to herein means a resin particle to which the specified silica particles does not are externally added among resin particles.

While a reason why the resin particle according to the first exemplary embodiment keeps fluidity is not elucidated yet, it may be considered to be caused as follows.

The specified silica particles which are externally added onto the surface of the resin mother particle is silica particles having such characteristics that the primary particles in a heterogeneous shape having the already-described volume average particle diameter has a particle size distribution with a wide distribution width and that the circularity decreases with an increase of the volume average particle diameter (see the expression (1)).

Namely, the specified silica particles are silica particles having a wide distribution width including from primary particles having a relatively small particle diameter and a relatively large circularity to primary particles having a relatively large particle diameter and a relatively small circularity.

Here, in the silica particles, in general, there is a tendency that its fluidity becomes good with an increase of the particle diameter, whereas its fluidity becomes deteriorated with a decrease of the particle diameter. On the other hand, in the silica particles, there is a tendency that its fluidity becomes good with an increase of the circularity, whereas its fluidity becomes deteriorated with a decrease of the circularity.

In view of the fact that the specified silica particles have the above-described wide distribution width, it may be considered that the fluidity is ensured while keeping the heterogeneous shape as the whole of particles. In the case where the specified silica particles are externally added onto the surface of the resin mother particle, it may be considered that even when a mechanical load is applied from the outside, a load of the specified silica particles against the resin particle is dispersed due to its fluidity.

Also, in the silica particles according to the first exemplary embodiment, in view of the fact that the circularity decreases with an increase of the particle diameter, it may be considered that even when a mechanical load is applied from the outside, the fluidity of the resin particle is ensured because movement into a concave of the surface of the resin particle by rolling or detachment hardly occurs as compared with silica particles having a large particle diameter and a high circularity.

In light of the above, it may be considered that even when a load is applied to the resin particle according to the first exemplary embodiment, the specified silica particles are hardly embedded into the resin mother particle and are externally added onto the surface of the resin mother particle while keeping the heterogeneous shape, and the specified silica particles hardly causes movement into a concave of the surface of the resin particle by rolling or detachment, and therefore, the fluidity is kept.

The resin particle of the first exemplary embodiment is hereinafter described in detail.

First of all, the silica particles (specified silica particles) which are externally added onto the surface of the resin mother particle are described.

[Silica Particles (Specified Silica Particles)]

In the silica particles (specified silica particles) externally added onto the surface of the resin mother particle, the primary particles having a volume average particle diameter of from 100 nm to 500 nm, a particle size distribution index of from 1.40 to 1.80 and an average circularity of from 0.5 to 0.85 has a regression line expressed by the following expression (1) with respect to the circularity and the volume average particle diameter (nm).

$$\text{Circularity} = \alpha \times (\text{Volume average particle diameter})/1000 + \beta \quad (1)$$

In the expression (1), $\alpha$ is from $-2.5$ to $-0.9$ ($-2.5 \leq \alpha \leq -0.9$), and $\beta$ is from 0.8 to 1.2 ($0.8 \leq \beta \leq 1.2$).

—Volume Average Particle Diameter—

In the specified silica particles, a volume average particle diameter of the primary particles is from 100 nm to 500 nm.

When the volume particle diameter of the primary particles is less than 100 nm, the shape of the particle is easy to become spherical, so that a shape having a circularity of from 0.5 to 0.85 may not be achieved. Also, in the case where the silica particles are coated on the resin particle, the silica particles are hardly dispersed on the surface of the resin mother particle. When the volume average particle diameter of the primary particles exceeds 500 nm, in the case where a mechanical load is applied to the silica particles, the silica particles are easily broken. Also, in the case where the silica particles are allowed to be externally added onto the resin mother particle, the strength of the resin particle is hardly enhanced, and the fluidity of the resin particle is hardly increased.

The volume average particle diameter of the primary particles is desirably from 100 nm to 350 nm, and more desirably from 100 nm to 250 nm.

The volume average particle diameter of the primary particles of the specified silica particles means a 50% diameter ($D_{50v}$) in a cumulative frequency of circle-corresponding diameters obtained by observing 100 primary particles after dispersing the specified silica particles in the resin mother particle having a volume average particle diameter of 100 μm (for example, a polyester resin having a weight average molecular weight Mw of 50,000) by an SEM (scanning electron microscope) apparatus and then performing an image analysis of the primary particles.

—Particle Size Distribution Index—

In the specified silica particles, a particle size distribution index of the primary particles is from 1.40 to 1.80.

When the particle size distribution index of the primary particles is less than 1.40, since the primary particles are relatively monodispersed, uneven distribution of the characteristics toward either fluidity or suppression of embedding into the resin particle is caused, so that it is difficult to satisfy the both characteristics. What the particle size distribution index of the primary particles exceeds 1.80 is not desirable because coarse particles are generated, or dispersibility into the resin particle is deteriorated due to scattering of the volume average particle diameter.

The particle size distribution index of the primary particles is desirably from 1.4 to 1.75.

The particle size distribution index of the primary particles of the specified silica particles as referred to herein means a square root of a value obtained by dividing 84% diameter by 16% diameter in a cumulative frequency of circle-corresponding diameters obtained by observing 100 primary particles after dispersing the specified silica particles in the resin mother particle having a volume average particle diameter of 100 μm (for example, a polyester resin having a weight average molecular weight Mw of 50,000) by an SEM apparatus and then performing an image analysis of the primary particles.

—Average Circularity—

In the specific silica particles, an average circularity of the primary particles is from 0.5 to 0.85.

When the average circularity of the primary particles exceeds 0.85, since the primary particles are close to a sphere, on the occasion of allowing the silica particles to be externally added onto the surface of the resin mother particle, mixing properties or adhesion to the resin particle is poor, so that the resulting particle is weak against a mechanical load and loses fluidity. For that reason, for example, in the case of mixing the silica particles and the resin particle and stirring the mixture, after storage with time, the silica particles may possibly unevenly attach onto the surface of the resin mother particle or desorb from the resin particle. When the average circularity of the primary particles is less than 0.5, the resulting particle has a shape of a large aspect ratio, and in the case where a mechanical load is applied to the silica particles, stress concentration is caused, so that the resulting particle is easily broken. Incidentally, in the case of producing the silica particles by a sol-gel method, it is difficult to produce silica particles in which primary particles thereof have an average circularity of less than 0.5.

The average circularity of the primary particles is desirably from 0.6 to 0.8.

Incidentally, the circularity of the primary particles is obtained as "100/SF2" which is calculated according to the following expression (2) by observing primary particles after dispersing the specified silica particles in the resin mother particle having a volume average particle diameter of 100 μm (for example, a polyester resin having a weight average molecular weight Mw of 50,000) by SEM and then performing an image analysis of the obtained primary particles.

$$\text{Circularity}(100/SF2) = 4\pi \times (A/I^2) \quad (2)$$

In the expression (2), I represents a circumferential length of the primary particles, and A represents a projected area of the primary particles.

The average circularity of the primary particles is obtained as 50% circularity in a cumulative frequency of circularities of 100 primary particles obtained by the foregoing image analysis.

—Expression (1) [Relation Between Circularity and Volume Average Particle Diameter of Primary Particles]—

In the specified silica particles, the primary particles having the already-described volume average particle diameter, average circularity and particle size distribution index has a regression line expressed by the following expression (1) with respect to the circularity and the volume average particle diameter.

$$\text{Circularity} = \alpha \times (\text{Volume average particle diameter})/1000 + \beta \quad (1)$$

In the expression (1), $\alpha$ is from $-2.5$ to $-0.9$ ($-2.5 \leq \alpha \leq -0.9$), and $\beta$ is from 0.8 to 1.2 ($0.8 \leq \beta \leq 1.2$).

In the expression (1), the circularity and the volume average particle diameter are values measured by observing primary particles after dispersing the specified silica particles in the resin mother particle having a volume average particle diameter of 100 µm by SEM and performing an image analysis, respectively, and the circularity is calculated according to the foregoing expression (2).

When the circularity of the primary particles is larger than the range calculated according to the expression (1) relative to the volume average particle diameter, though the fluidity is good, the primary particles are easily embedded into the resin particle. When the circularity of the primary particles is smaller than the range calculated according to the expression (1) relative to the volume average particle diameter, though the primary particles are hardly embedded into the resin particle, the fluidity is impaired.

$\alpha$ and $\beta$ in the expression (1) are values of a slope ($\alpha$) and an intercept ($\beta$), respectively of a regression line at the time of plotting the volume average particle diameter versus the circularity on an axis of coordinates with respect to 100 primary particles of the specified silica particles. When $\alpha$ is less than $-2.5$, the circularity relative to the volume average particle diameter becomes too low, so that particle shape stability against the mechanical load is lowered; whereas when $\alpha$ is more than $-0.9$, the circularity relative to the volume average particle diameter becomes too large, so that the primary particles are easily embedded into the resin mother particle. Also, when $\beta$ is less than 0.8, the circularity relative to the volume average particle diameter becomes too low, so that particle shape stability against the mechanical load is lowered; whereas when $\beta$ is more than 1.2, the circularity relative to the volume particle diameter becomes too large, the primary particles are easily embedded into the resin mother particle.

$\alpha$ is desirably from $-2$ to $-1$ ($-2 \leq \alpha \leq -1$), and $\beta$ is desirably from 0.9 to 1.1 ($0.9 \leq \beta \leq 1.1$).

(Components and Surface Treatment)

The specified silica particle may be a particle composed mainly of silica, namely $SiO_2$ and may be either crystalline or amorphous. Also, the specified silica particles may be a particle produced using, as a raw material, a silicon compound such as water glass and an alkoxysilane, or may be a particle obtained by pulverizing quartz.

Also, from the viewpoint of dispersibility of the specified silica particles, it is preferable that the surface of the specified silica particles is subjected to a hydrophobic treatment. For example, the specified silica particles are hydrophobilized by bonding an alkyl group onto the surface of the specified silica particles. For that reason, for example, a known organosilicon compound having an alkyl group may be allowed to act on the specified silica particles. Details of a method of the hydrophobic treatment are described later.

[Resin Mother Particle]

Though the components and shape of the resin mother particle which is subjective to the attachment of the specified silica particles are not particularly limited, it is preferable that the volume average particle diameter is from 2 µm to 20 µm.

When the volume average particle diameter of the resin mother particle is 2 µm or more, a lowering of the fluidity can be suppressed. Also, when the volume average particle diameter of the resin mother particle is not more than 20 µm, in the case where the resin particle according to the first exemplary embodiment is used for an application of a powder coating material, slush molding or a recording material, uniformity of a coating film or an image formed upon being incorporated with the resin particle according to the first exemplary embodiment is hardly lowered.

The volume average particle diameter of the resin mother particle is more preferably from 3 µm to 15 µm.

Here, the volume average particle diameter of the resin mother particle is measured using Coulter Multisizer Type II (manufactured by Beckman Coulter, Inc.) and using ISOTON-II (manufactured by Beckman Coulter, Inc.) as an electrolytic solution.

At the measurement, a measurement sample in an amount ranging from 0.5 mg to 50 mg is added to 2 mL of a 5% by mass aqueous solution of, as a dispersant, a surfactant, for example, a sodium alkylbenzenesulfonate. This mixture is added to the electrolytic solution in an amount of from 100 mL to 150 mL.

The electrolytic solution having the sample suspended therein is subjected to a dispersing treatment for one minute using an ultrasonic disperser, and a particle size distribution of particles having a particle diameter ranging from 2 µm to 50 µm is measured using a 100-µm aperture as an aperture size by the Coulter Multisizer Type II. Incidentally, 50,000 particles are sampled.

A cumulative distribution of each of the volume and the number is drawn from the small diameter side with respect to the particle size range (channel) divided on the basis of the thus measured particle size distribution. A particle diameter at an accumulation of 16% is defined as an accumulation volume particle diameter $D_{16v}$, and an accumulation number average particle diameter $D_{16p}$, respectively; a particle diameter at an accumulation of 50% is defined as an accumulation volume particle diameter $D_{50v}$, and an accumulation number average particle diameter $D_{50p}$, respectively; and a particle diameter at an accumulation of 84% is defined as an accumulation volume particle diameter $D_{84v}$, and an accumulation number average particle diameter $D_{84p}$, respectively.

Here, the volume average particle diameter is determined as an accumulation volume average particle diameter $D_{50v}$.

The resin mother particle may contain a resin. The resin which the resin mother particle contains is hereinafter also referred to as a "mother resin".

As the mother resin, a thermoplastic resin composed of a natural or synthetic polymer of every kind may be used.

Examples thereof include a polyolefin resin such as polyethylene and polypropylene; a polystyrene resin such as polystyrene and an acrylonitrile/butadiene/styrene copolymer (ABS resin); an acrylic resin such as polymethyl methacrylate and polybutyl methacrylate; a rubbery (co)polymer such as polybutadiene and polyisoprene; a polyester resin such as polyethylene terephthalate and polybutylene terephthalate; a vinyl based resin such as a vinyl chloride resin, a vinyl aromatic resin and a polyvinyl resin; an epoxy resin; a conjugated diene resin; a polyamide resin; a polyacetal resin; a polycarbonate resin; a thermoplastic polyurethane resin; and a fluorocarbon resin. Such a resin is used solely or in admixture.

Typically, an epoxy resin, a styrene-acrylic resin, a polyamide resin, a polyester resin, a polyvinyl resin, a polyolefin resin, a polyurethane resin or a polybutadiene resin each having a weight average molecular weight of from 5,000 to 100,000 is used solely or in admixture.

In the case where the resin particle according to the first exemplary embodiment is applied to an application for powder coating material, a polyester resin, an epoxy resin or an acrylic resin is suitable as the mother resin.

In the case where the resin particle according to the first exemplary embodiment is applied to an application for slush molding, a thermoplastic polyurethane resin, a vinyl chloride resin, a polyolefin resin, an acrylate based resin powder, a vinyl aromatic resin or a conjugated diene resin is suitable as the mother resin.

In the case where the resin particle according to the first exemplary embodiment is applied to an application for recording material (for example, a toner), a polyester resin or an acrylic resin is suitable as the mother resin.

An additive such as an inorganic particle other than the specified silica particles, an ultraviolet absorbing material and an antioxidant may be further incorporated into (internally added to) the resin mother particle depending upon the desired application.

An attachment amount of the specified silica particles external added onto the surface of the resin mother particle is preferably in the range of from 5% to 80% in terms of a coverage of the specified silica particles relative to a surface area of the resin mother particle according to the calculation (also referred to as a "calculated coverage").

In the case where an addition amount of the resin mother particle is defined as A (g), a specific gravity of the resin mother particle is defined as B (g/cm$^3$), a volume average particle diameter of the resin mother particle is defined as C (μm), an addition amount of the specified silica particless is defined as D (g), a specific gravity of the specified silica particless is defined as E (g/cm$^3$), and a volume average particle diameter of the specified silica particless is defined as F (nm), the calculated coverage (%) is calculated as $[(\sqrt{3} \times B \times C \times D/(2 \times \pi \times F \times E \times 0.001 \times A)) \times 100]$.

When the calculated coverage is 5% or more, it is possible to suppress a lowering of the fluidity of the resin particle according to the first exemplary embodiment, whereas when the calculated coverage is not more than 80%, it is possible to avoid various obstacles such as pollution to be caused due to detachment of the specified silica particles.

The attachment amount of the specified silica particles is more preferably in the range of from 30% to 70% in terms of the calculated coverage.

(Application)

The resin particle according to the first exemplary embodiment is easy to keep the heterogeneous shape against a mechanical load such as stirring. The resin particle according to the first exemplary embodiment allows the specified silica particles in a heterogeneous shape which is hardly embedded into the resin mother particle to be externally added onto the surface of the resin mother particle. The subject specified silica particles are hardly detachment from the surface of the present mother particle. For that reason, excellent fluidity of the resin particle is achieved, and the fluidity is kept, and therefore, the resin particle according to the first exemplary embodiment may be applied to various applications such as a powder coating material and a recording material represented by a toner. Also, the resin particle according to the first exemplary embodiment may be applied to a so-called slush molding (also called "powder slush molding") application for performing melt molding by casting a resin particle into a heated molding die.

<Preparation Method of Resin Particle>

A preparation method of a resin particle according to the first exemplary embodiment may be achieved by allowing the specified silica particles having the already-described physical properties to be externally added onto the surface of the resin mother particle.

Also, the preparation method of the specified silica particles is not particularly limited so far as the resulting silica particles have the already-described physical properties, namely, primary particles thereof having a volume average particle diameter of from 100 nm to 500 nm, a particle size distribution index of from 1.40 to 1.80 and an average circularity of from 0.5 to 0.85 has a regression line expressed by the foregoing expression (1) with respect to the circularity and the volume average particle diameter (nm).

For example, the specified silica particles may be obtained by a dry method in which silica particles having a volume average particle diameter exceeding 500 nm is pulverized and classified, or may be produced by a so-called wet method in which a particle is formed by a sol-gel method using, as a raw material, a silicon compound represented by an alkoxysilane. As a wet method, in addition to the sol-gel method, there is also included a method of obtaining a silica sol using water glass as a raw material.

In the resin particle according to the first exemplary embodiment, the specified silica particles in which a primary particles thereof having a volume average particle diameter of from 100 nm to 500 nm, a particle size distribution index of from 1.40 to 1.80 and an average circularity of from 0.5 to 0.85 has a regression line expressed by the expression (1) with respect to the circularity and the volume average particle diameter (nm) attaches onto the surface of the resin mother particle. Therefore, in order to prepare a resin particle having the specified silica particles having such various physical properties attached thereto, it is desirable to adopt a preparation method of a resin particle having the following steps according to a second exemplary embodiment.

The preparation method of a resin particle according to the second exemplary embodiment includes a step of preparing an alkaline catalyst solution containing an alkaline catalyst in a concentration of from 0.6 mol/L to 0.85 mol/L in an alcohol-containing solvent (also referred to as an "alkaline catalyst solution preparing step"); a step of supplying a tetraalkoxysilane in a supply amount of from 0.006 mol/(mol·min) to 0.009 mol/(mol·min) relative to the alcohol into the alkaline catalyst solution and also supplying an alkaline catalyst in an amount of from 0.1 mol to 0.4 mol per mole of the total supply amount of the tetraalkoxysilane to be supplied per minute to obtain a silica particless (specified silica particless) (also referred to as a "silica particless forming step"); and a step of allowing the obtained silica particless (specified silica particless) to attach onto the surface of a resin mother particle (also referred to as a "silica particless attaching step").

Namely, the preparation method of a resin particle according to the second exemplary embodiment is concerned with a method in which a tetraalkoxysilane as a raw material is allowed to react in the presence of an alcohol in which an alkaline catalyst in the foregoing concentration is contained while supplying the tetraalkoxysilane and separately, an alkaline catalyst, respectively in the foregoing relation, thereby forming a specified silica particles, and the formed specified silica particles is allowed to attach onto the surface of the resin mother particle of the resin particle.

In the preparation method of a resin particle according to the second exemplary embodiment, the specified silica particles in a heterogeneous shape, which is small in the generation of a coarse aggregate, is obtained. While a reason for this is not elucidated yet, it may be considered that this is caused due to the following reason.

First of all, when an alkaline catalyst solution containing an alkaline catalyst in an alcohol-containing solvent is prepared, and a tetraalkoxysilane and an alkaline catalyst are supplied, respectively in this solution, the tetraalkoxysilane supplied into the alkaline catalyst solution reacts to form a nucleus particle. At that time, when the alkaline catalyst concentration in the alkaline catalyst solution falls within the foregoing range, it may be considered that a nucleus particle in a heterogeneous shape is formed while suppressing the formation of a coarse aggregate such as a secondary aggregate. It may be considered that this is caused due to the matter that though in addition to the catalytic action, the alkaline catalyst has an action to coordinate to the surface of the nucleus particle to be formed, thereby contributing to the formation and dispersion stability of the nucleus particle, when its amount falls within the foregoing range, the alkaline catalyst does not uniformly coat the surface of the nucleus particle (namely, the alkaline catalyst unevenly attaches onto the surface of the nucleus particle), and therefore, while the dispersion stability of the nucleus particle is kept, partial deviations in surface tension and chemical affinity of the nucleus particle are caused, so that the nucleus particle in a heterogeneous shape is formed.

Then, when the supply of each of the tetraalkoxysilane and the alkaline catalyst is continued, the formed nucleus particle grows due to the reaction of the tetraalkoxysilane, whereby silica particles are obtained. Here, it may be considered that by performing the supply of each of the tetraalkoxysilane and the alkaline catalyst while keeping the supply amounts thereof in the foregoing relations, the nucleus particle in a heterogeneous shape undergoes particle growth with its heterogeneous shape being kept while suppressing the formation of a coarse aggregate such as a secondary aggregate, and as a result, silica particles in a heterogeneous shape is formed. This is because by allowing the supply amounts of the tetraalkoxysilane and the alkaline catalyst to satisfy with the foregoing relations, the partial deviations in tension and chemical affinity on the surface of the nucleus particle are kept while keeping dispersion of the nucleus particle, so that the particle growth of the nucleus particle is caused while keeping the heterogeneous shape.

Here, it may be considered that the supply amount of the tetraalkoxysilane is related to the particle size distribution or the circularity of the silica particles. It may be considered that by regulating the supply amount of the tetraalkoxysilane to the range of from 0.006 mol/(mol·min) to 0.009 mol/(mol·min), before a contact probability between the tetraalkoxysilane and the nucleus particle at a particle growth stage is increased, and the tetraalkoxysilane is supplied to the nucleus particle without a deviation, a reaction between the tetraalkoxysilane and the nucleus particle may be caused. Namely, it may be considered that the reaction between the tetraalkoxysilane and the nucleus particle is deviated. For that reason, it may be considered that the deviation of the supply of the tetraalkoxysilane into the nucleus particle is accelerated, thereby bringing scattering of the particle growth. For that reason, it may be conjectured that the volume average particle diameter and the shape distribution of the silica particles are expanded.

In consequence, it may be considered that by allowing the supply amount of the tetraalkoxysilane to fall within the foregoing range, primary particles in a heterogeneous shape having a regression line expressed by the expression (1) and having a particle size distribution index of from 1.40 to 1.80 and an average circularity of from 0.5 to 0.85 is easily formed.

Incidentally, it may be considered that the volume average particle diameter of the silica particles is dependent upon the total supply amount of the tetraalkoxysilane.

In light of the above, in the preparation method of a resin particle according to the second exemplary embodiment, it may be considered that silica particles in a heterogeneous shape (specified silica particles), which are small in the formation of a coarse aggregate and in which primary particles thereof have a regression line expressed by the expression (1) and have a particle size distribution index of from 1.40 to 1.80 and an average circularity of from 0.5 to 0.85, are obtained.

By allowing the specified silica particles obtained by the foregoing method to be externally added onto the surface of the resin mother particle, a resin particle in which the fluidity is kept may be produced.

Also, in the alkaline catalyst solution preparing step and the silica particles forming step (the both steps will be also generally called a "specified silica particles producing step") in the preparation method of a resin particle according to the second exemplary embodiment, it may be considered that a nucleus particle in a heterogeneous shape is formed, and the nucleus particle is allowed to grow while keeping this heterogeneous shape, thereby forming silica particles. Therefore, it may be considered that silica particles in a heterogeneous shape having high shape stability against a mechanical load are obtained.

Also, in the specified silica particles producing step, it may be considered that the particle is allowed to grow in a state where the formed nucleus particle in a heterogeneous shape keeps its heterogeneous shape, whereby the silica particles are obtained. Therefore, it may be considered that the silica particles which are strong against a mechanical load and are hardly broken are obtained.

Also, in the specified silica particles producing step, in view of the fact that the particle formation is performed by supplying each of the tetraalkoxysilane and the alkaline catalyst into the alkaline catalyst solution and causing a reaction of the tetraalkoxysilane, as compared with the case of producing silica particles in a heterogeneous shape by a conventional sol-gel method, a total amount of the used alkaline catalyst is small, and as result, an omission of a removal step of the alkaline catalyst is realized. This is advantageous especially in the case where silica particles are applied to products in which a high purity is required.

—Alkaline Catalyst Solution Preparing Step—

First of all, the alkaline catalyst solution preparing step is described.

In the alkaline catalyst solution preparing step, an alcohol-containing solvent is prepared, to which is then added an alkaline catalyst to prepare an alkaline catalyst solution.

The alcohol-containing solvent may be a solvent composed of an alcohol solely, or may be a mixed solvent of an alcohol with other solvent such as water; ketones (for example, acetone, methyl ethyl ketone, methyl isobutyl ketone, etc.); cellosolves (for example, methyl cellosolve, ethyl cellosolve, butyl cellosolve, cellosolve acetate, etc.); and ethers (for example, dioxane, tetrahydrofuran, etc.), if desired. In the case of a mixed solvent, it would be better that an amount of the alcohol relative to other solvent is 80% by mass or more (desirably 90% by mass or more).

Incidentally, examples of the alcohol include lower alcohols such as methanol and ethanol.

Meanwhile, the alkaline catalyst is a catalyst for accelerating the reaction (for example, a hydrolysis reaction or a condensation reaction) of the tetraalkoxysilane, and examples thereof include basic catalysts such as ammonia, urea, a monoamine and a quaternary ammonium salt. Of these, ammonia is especially desirable.

A concentration (content) of the alkaline catalyst is from 0.6 mol/L to 0.85 mol/L, desirably from 0.63 mol/L to 0.78 mol/L, and more desirably from 0.66 mol/L to 0.75 mol/L.

When the concentration of the alkaline catalyst is less than 0.6 mol/L, dispersibility of a formed nucleus particle in a growth process of the nucleus particle becomes instable, so that there is a concern that a coarse aggregate such as a secondary aggregate is formed, or gelation occurs, thereby deteriorating the particle size distribution.

On the other hand, when the concentration of the alkaline catalyst is more than 0.85 mol/L, stability of a formed nucleus particle becomes excessive, a nucleus particle in a true spherical shape is formed, and a nucleus in a heterogeneous shape having an average circularity of not more than 0.85 is not obtained, and as a result, the specified silica particles in a heterogeneous shape are not obtained.

Incidentally, the concentration of the alkaline catalyst is a concentration relative to the alcohol catalyst solution (the alkaline catalyst+the alcohol-containing solvent).

—Silica Particles Forming Step—

Next, the silica particles forming step is described.

The silica particles forming step is a step of supplying each of a tetraalkoxysilane and an alkaline catalyst into the alkaline catalyst solution to subject the tetraalkoxysilane to a reaction (for example, a hydrolysis reaction or a condensation reaction) in the alkaline catalyst solution, thereby forming silica particles.

In this silica particles forming step, at the beginning of supply of the tetraalkoxysilane, a nucleus particle is formed by the reaction of the tetraalkoxysilane (nuclear particle forming stage), and thereafter, the silica particles are formed through growth of this nucleus particle (nucleus particle growing stage).

Examples of the tetraalkoxysilane which is supplied into the alkaline catalyst solution include tetramethoxysilane, tetraethoxysilane, tetrapropoxysilane and tetrabutoxysilane. However, from the standpoints of controllability of the reaction rate, the shape, volume average particle diameter and particle size distribution of the obtained silica particles, and the like, tetramethoxysilane or tetraethoxysilane is suitable.

A supply amount of the tetraalkoxysilane is from 0.006 mol/(mol·min) to 0.009 mol/(mol·min) relative to the alcohol in the alkaline catalyst solution.

This means that the tetraalkoxysilane is supplied in a supply amount of from 0.006 mol to 0.009 mol per minute relative to one mole of the alcohol used in the step of preparing an alkaline catalyst solution.

By allowing the supply amount of the tetraalkoxysilane to fall within the foregoing range, silica particles in a heterogeneous shape, in which primary particles thereof have a regression line expressed by the expression (1) and have a particle size distribution index of from 1.40 to 1.80 and an average circularity of from 0.5 to 0.85, are easily formed in a high proportion (for example, 95% by number or more).

Incidentally, though the volume average particle diameter of the silica particles varies with the kind of the tetraalkoxysilane or the reaction condition, primary particles having a volume average particle diameter of 100 nm or more are obtained by regulating a total supply amount of the tetraalkoxysilane used for the reaction of particle formation to, for example, 1.08 moles or more per liter of the silica particles dispersion liquid, and primary particles having a volume average particle diameter of not more than 500 nm is obtained by regulating a total supply amount of the tetraalkoxysilane used for the reaction of particle formation to, for example, not more than 5.49 moles or more per liter of the silica particles dispersion liquid.

When the supply amount of the tetraalkoxysilane is less than 0.006 mol/(mol·min), it may be considered that the tetraalkoxysilane may be supplied without a deviation before the reaction between the nucleus particle and the tetraalkoxysilane, and therefore, silica particles having a similar shape are formed without causing deviations in both the volume average particle size and the shape, so that a particle with a sharp distribution is formed.

When the supply amount of the tetraalkoxysilane is more than 0.009 mol/(mol·min), it may be considered that the supply amount of the tetraalkoxysilane becomes excessive relative to the reaction between tetraalkoxysilanes with each other at a nucleus particle forming stage, or the reaction between the tetraalkoxysilane and the nucleus particle in the particle growth, so that the reaction system is easily gelled, thereby impairing the nucleus particle formation and the particle growth.

The supply amount of the tetraalkoxysilane is desirably from 0.0065 mol/(mol·min) to 0.0085 mol/(mol·min), and more desirably from 0.007 mol/(mol·min) to 0.008 mol/(mol·min).

Meanwhile, examples of the alkaline catalyst which is supplied into the alkaline catalyst solution include those exemplified above. Though this alkaline catalyst to be supplied may be the same as or different from the alkaline catalyst previously contained in the alkaline catalyst solution, it would be better to use the alkaline catalyst of the same kind.

A supply amount of the alkaline catalyst is from 0.1 mol to 0.4 mol, desirably from 0.14 mol to 0.35 mol, and more desirably from 0.18 mol to 0.30 mol per mole of the total supply amount of the tetraalkoxysilane to be supplied per minute.

When the supply amount of the alkaline catalyst is less than 0.1 mol, dispersibility of a formed nucleus particle in a growth process of the nucleus particle becomes instable, so that there is a concern that a coarse aggregate such as a secondary aggregate is formed, or gelation occurs, thereby deteriorating the particle size distribution.

On the other hand, when the supply amount of the alkaline catalyst is more than 0.4 mol, stability of a formed nucleus particle becomes excessive, and even when a nucleus particle in a heterogeneous shape is formed at a nucleus particle forming stage, the nucleus particle grows in a spherical shape at its nucleus particle growth stage, so that silica particles in a heterogeneous shape is not obtained.

Here, in the silica particles forming step, each of the tetraalkoxysilane and the alkaline catalyst is supplied into the alkaline catalyst solution. The supply method may be a mode of continuously supplying them, or a mode of intermittently supplying them.

Also, in the silica particles forming step, a temperature in the alkaline catalyst solution (temperature at the time of supply) may be, for example, in the range of from 5° C. to 50° C. and is desirably in the range of from 15° C. to 40° C.

The specified silica particles are obtained through the foregoing steps. Though the specified silica particles obtained in this state are obtained in a state of a dispersion liquid, it may be used as silica particles dispersion liquid as it is, or may be taken out and used as a powder of the silica particles after removing the solvent.

In the case of using the specified silica particles as silica particles dispersion liquid, solids concentration of the silica particles may be adjusted upon being diluted with water or an alcohol or being concentrated, if desired. Also, the silica particles dispersion liquid may be used upon being subjected to solvent substitution with a water-soluble organic solvent such as other alcohol, an ester and a ketone.

Meanwhile, in the case of using the specified silica particles as a powder of the silica particles, it is necessary to remove the solvent from the silica particles dispersion liquid. Examples of a method of removing this solvent include known methods such as (1) a method of performing drying using a vacuum dryer, a tray type dryer, etc. after removing the solvent by means of filtration, centrifugation, distillation or the like; and (2) a method of directly drying the slurry using a fluidized layer dryer, a spray dryer or the like. Though a drying temperature is not particularly limited, it is desirably not higher than 200° C. When the drying temperature is higher than 200° C., bonding among primary particles to each other or generation of coarse particles due to condensation of a silanol group remaining on the surface of the silica particles is easy to occur.

It would be better that if desired, the dried silica particles are crushed and sieved, thereby removing a coarse particle or aggregate. Though a crushing method is not particularly limited, it is, for example, performed by a dry type pulverizer such as a jet mill, a vibration mill, a ball mill and a pin mill. A sieving method is, for example, performed using a known device such as a vibration sieve and a wind force sieve.

The specified silica particles obtained by the specified silica particles producing step may be used after subjecting the surface of the specified silica particles to a hydrophobic treatment with a hydrophobic treatment agent.

Examples of the hydrophobic treatment agent include known organosilicon compounds having an alkyl group (for example, a methyl group, an ethyl group, a propyl group, a butyl group, etc.). Specific examples thereof include silazane compounds (for example, hexamethyldisilazane, tetramethyldisilazane, etc.) and silane compounds (for example, methyltrimethoxysilane, dimethyldimethoxysilane, trimethylchlorosilane, trimethylmethoxysilane, etc.). The hydrophobic treatment agent may be used solely or in combination of plural kinds thereof.

Of these hydrophobic treatment agents, organosilicon compounds having a trimethyl structure, such as trimethylmethoxysilane and hexamethyldisilazane, are suitable.

Though a use amount of the hydrophobic treatment agent is not particularly limited, in order to obtain a hydrophobic effect, it is, for example, from 1% by mass to 100% by mass, and desirably from 5% by mass to 80% by mass relative to the specific silica particles.

Examples of a method of obtaining hydrophobic silica particles dispersion liquid having been subjected to a hydrophobic treatment with a hydrophobic treatment agent include a method of obtaining a hydrophobic silica particles dispersion liquid by adding a necessary amount of a hydrophobic treatment agent to silica particles dispersion liquid having the specified silica particles dispersed therein and allowing the mixture to react with stirring at a temperature ranging from 30° C. to 80° C., thereby subjecting the specified silica particles to a hydrophobic treatment. When this reaction temperature is a lower temperature than 30° C., the hydrophobic reaction hardly proceeds, whereas when the reaction temperature is a temperature exceeding 80° C., there may be the case where gelation of the dispersion liquid by self-condensation of the hydrophobic treatment agent or aggregation among silica particles to each other is easy to occur.

Meanwhile, examples of a method of obtaining powdered hydrophobic silica particles include a method in which a hydrophobic silica particles dispersion liquid is obtained by the foregoing method and then dried by the foregoing method, thereby obtaining a powder of hydrophobic silica particles; a method in which a silica particles dispersion liquid is dried to obtain a powder of hydrophilic silica particles, which is then subjected to a hydrophobic treatment by the addition of a hydrophobic treatment agent, thereby obtaining a powder of a hydrophobic silica powder; and a method in which after obtaining a hydrophobic silica particles dispersion liquid, the hydrophobic silica particles dispersion liquid is dried to obtain powder of hydrophobic silica particles, which is further subjected to a hydrophobic treatment by the addition of a hydrophobic treatment agent, thereby obtaining powder of hydrophobic silica particles.

Here, examples of a method of subjecting powdered specific silica particles to a hydrophobic treatment include a method in which powdered hydrophilic silica particles are stirred within a treatment tank such as a Henschel mixer and a fluidized bed, a hydrophobic treatment agent is added thereto, and the inside of the treatment tank is heated to gasify the hydrophobic treatment agent, thereby allowing it to react with a silanol group on the surface of the powdered specified silica particles. Though a treatment temperature is not particularly limited, it may be, for example, from 80° C. to 300° C., and it is desirably from 120° C. to 200° C.

—Silica Particles Attaching Step—

In the silica particles attaching step, silica particles (specified silica particles) obtained in the silica particles forming step is allowed to be externally added onto the surface of the resin mother particle.

Examples of a method of allowing the specified silica particles onto the surface of the resin mother particle include a method in which the specified silica particles and the resin particle and optionally, a component to be allowed to attach are added and stirred in a V-type blender, a Henschel mixer, a Loedige mixer or the like. The specified silica particles may be allowed to be externally added onto the surface of the resin mother particle in a divided manner.

As described previously, in the resin particle according to the first exemplary embodiment, it is preferable that the specified silica particles attach at a calculated coverage ranging from 5% to 80% onto the surface of the resin mother particle.

In order to regulate the attachment amount of the specified silica particles to the foregoing range, it would be better to add the specified silica particles in an amount of from 0.1% by mass to 10% by mass relative to the total mass of the resin mother particle in a V-type blender, a Henschel mixture, a Loedige mixer or the like.

(Preparation of Resin Mother Particle)

The resin mother particle may be, for example, produced by a method in which a mother resin is heat melted and kneaded, followed by pulverization and classification (kneading and pulverization method); a method in which an oil phase having a mother resin dissolved in a water-soluble organic solvent is suspended and dispersed in an aqueous phase containing a dispersant, followed by removal of the solvent (dissolution and suspension method); or a method in which a mother resin obtained from a mother resin monomer by means of emulsion polymerization or the like is aggregated to form a particle (emulsion polymerization and aggregation method).

In the case of incorporating the foregoing respective components such as an organic particle into the resin mother particle, it would be better to previously mix the mother resin and the foregoing respective components. In the case of an emulsion polymerization and aggregation method, it would be better to mix the mother resin monomer and the foregoing respective components and subject the mixture to emulsion polymerization.

EXAMPLES

The invention is more specifically described below with reference to the following Examples. However, it should not be construed that the respective Examples limit the invention. Also, all parts and percentages are on a mass basis unless indicated.

Example 1

(Preparation of Silica Particles)
—Alkaline Catalyst Solution Preparing Step [Preparation of Alkaline Catalyst Solution (1)]—

In a glass-made reaction vessel having a volume of 2 L and equipped with a stirring blade, a dropping nozzle and a thermometer, 300 g of methanol and 50 g of 10% ammonia water are charged and mixed with stirring to obtain an alkaline catalyst solution (1). At that time, an ammonia catalyst amount, i.e., an $NH_3$ amount in the alkaline catalyst solution (1) ($NH_3$ [mol]/($NH_3$+methanol+water) [L]) is 0.68 mol/L.

—Silica Particles Forming Step [Preparation of Silica Particles Suspension (1)]—

Subsequently, a temperature of the alkaline catalyst solution (1) is adjusted to 25° C., and the alkaline catalyst solution (1) is substituted with nitrogen. Thereafter, dropwise addition of 450 g of tetramethoxysilane (TMOS) and 270 g of ammonia water having a catalyst ($NH_3$) concentration of 4.44% by mass in the following supply amounts is simultaneously started while stirring the alkaline catalyst solution (1) at 120 rpm, and the dropwise addition is performed over 50 minutes, thereby obtaining a suspension of the silica particles (silica particles suspension (1)).

Here, the supply amount of tetramethoxysilane (TMOS) is set to 9 g/min, namely 0.0063 mol/(mol·min) relative to a total molar number of methanol in the alkaline catalyst solution (1). Also, the supply amount of the 4.44% ammonia water is set to 5.4 g/min relative to a total supply amount of the tetraalkoxysilane to be supplied per minute (0.0592 mol/min). This is corresponding to 0.24 mol/min per mole of the total supply amount of the tetraalkoxysilane to be supplied per minute.

Thereafter, 250 g of the solvent of the resulting silica particles suspension (1) is distilled off by means of heat distillation, and 250 g of pure water is added. Thereafter, the resultant is dried by a freeze dryer, thereby obtaining hydrophilic silica particles (1) in a heterogeneous shape.

—Hydrophobic Treatment of Silica Particles—

Furthermore, 20 g of trimethylsilane is added to 100 g of the hydrophilic silica particles (1), and the mixture is allowed to react at 150° C. for 2 hours, thereby obtaining hydrophobic silica particles (1) in a heterogeneous shape in which the surface of silica is subjected to a hydrophobic treatment.

<Physical Properties of Silica Particles>

The resulting hydrophobic silica particles (1) are added to a resin particle having a volume average particle diameter of 100 μm, and 100 primary particles of the hydrophobic silica particles (1) are subjected to SEM photography. Subsequently, the resulting SEM photograph is subjected to image analysis. As a result, the primary particles of the hydrophobic silica particles (1) is a heterogeneous particle having a volume average particle diameter ($D_{50v}$) of 180 nm, a particle size distribution index of 1.52 and an average circularity [100/SF2] of 0.58, and 99 particles of the 100 primary particles of the hydrophobic silica particles (1) having been subjected to SEM photography are satisfied with the expression (1).

In a regression line obtained from plotted points by taking the circularity on the ordinate and the volume average particle diameter on the abscissa, respectively with respect to the 100 primary particles of the hydrophobic silica particles (1) having been subjected to SEM photography, α is found to be −2.1, and β is found to be 1.1.

—Silica Particles Attaching Step—
(Preparation of Mother Resin)

In a reaction vessel equipped with a stirrer, a thermometer, a condenser and a nitrogen gas-introducing tube, the following components are charged.

| Dimethyl terephthalate: | 23% by mol |
| Isophthalic acid: | 10% by mol |
| Dodecenylsuccinic anhydride: | 15% by mol |
| Trimellitic anhydride: | 3% by mol |
| Bisphenol A ethylene oxide 2-mole adduct: | 5% by mol |
| Bisphenol A propylene oxide 2-mole adduct: | 45% by mol |

Subsequently, after substituting the inside of the reaction vessel with a dry nitrogen gas, dibutyltin oxide as a catalyst is added in a proportion of 0.06% by mole, and the respective components are allowed to react with stirring under a nitrogen gas stream at 190° C. for 7 hours.

Furthermore, the temperature in the reaction vessel is elevated to about 250° C., the reaction is performed with stirring for 5.0 hours, and the inside of the reaction vessel is then evacuated to 10.0 mg. The reaction is further performed with stirring under reduced pressure for 0.5 hours, thereby obtaining an amorphous polyester resin having a polar group in a molecule thereof (mother resin (1)).

(Preparation of Resin Mother Particle)

100 parts by mass of the resulting amorphous polyester resin (mother resin (1)) is melted and kneaded by a Banbury mixer type kneader. The kneaded material is molded in a plate form having a thickness of 1 cm by using a pressure roll; coarsely pulverized to an extent of about several millimeters by using a Fitz mill type pulverizer; more finely pulverized by using an IDS type pulverizer; and further classified by using an elbow type classifier, thereby obtaining an amorphous resin mother particle (1) having a volume average particle diameter of 7 μm.

(Attachment of Silica Particles)

To 20 g of the resulting resin mother (1) having a volume average particle diameter of 7 μm, the hydrophobic silica particles (1) are added in an amount (50%) shown in the column of "Coverage (%)" of "Silica particles" of "Particle attached step" in Table 1 and mixed in a 0.4-L sample mill at 15,000 rpm for 30 seconds, thereby obtaining a resin particle (1) having the hydrophobic silica particles (1) externally added thereto.

On that occasion, the resin mother particle (1) and the hydrophobic silica particles (1) are added in the sample mill in a ratio of the resin mother particle (1) to the hydrophobic silica particles (1) of 20/1.33 (on a mass basis).

<Evaluation of Resin Particle>

The resulting resin particle (1) is evaluated with respect to various characteristics. As a result, the resin particle (1) having the hydrophobic silica particles (1) externally added thereto is excellent in fluidity, and even after receiving a mechanical load such as stirring, it keeps the fluidity without causing embedding of the hydrophobic silica particles (1) into the surface of the resin mother particle.

Incidentally, details of evaluation methods of the various characteristics of the resin particle (1) are as follows.

(Evaluation of Water Dispersibility of Silica Particles)

With respect to the resin particle (1), the surface of the resin particle (1) is observed by SEM. Furthermore, an attached area of the hydrophobic silica particles (1) is measured by means of image analysis, from which is then calculated a coverage of the hydrophobic silica particles (1), thereby making evaluation according to the following evaluation criteria.

—Evaluation Criteria (Dispersibility)—

A: The silica particles are externally added onto the surface of the resin mother particle at a coverage of 45% or more without being unevenly distributed, and an aggregate is not substantially found.

B: Though an aggregate of the silica particles is slightly found, the silica particles are externally added onto the surface of the resin mother particle at a coverage of 40% or more and less than 45% without being unevenly distributed.

C: An aggregate of the silica particles is found here and there, and a coverage of the silica particles on the surface of the resin mother particle is less than 40%, so that dispersibility is poor.

(Evaluation of Embedding Properties of Silica after Giving Mechanical Load)

Embedding properties (keeping properties of embedding resistance) of the silica particles after applying a mechanical load to the resin particle are evaluated. Specifically, the evaluation is performed as follows.

5 g of the resin particle (1) and 200 g of a 100-μm iron powder are charged in a glass bottle and mixed for 60 minutes by a tumbler shaker. Thereafter, the surface of the resin particle (1) is observed by SEM, and an embedded state of the hydrophobic silica particles (1) is further observed by means of image analysis, thereby making evaluation according to the following criteria.

—Evaluation Criteria (Embedding Properties)—

A: The non-embedded silica particles remain in a proportion of 30% or more by number.

B: The non-embedded silica particles remain in a proportion of 5% by number or more and less than 30% by number.

C: A residual amount of the non-embedded silica particles is less than 5%.

(Evaluation of Detachment Properties after Applying Mechanical Load)

Detachment properties (keeping properties of detachment resistance) of the silica particles after applying a mechanical load to the resin particle are evaluated. Specifically, the evaluation is performed as follows.

5 g of the resin particle (1) and 200 g of a 100 μm iron powder are charged in a glass bottle and mixed for 60 minutes by a tumbler shaker. Thereafter, an amount of the hydrophobic silica particles (1) having transferred into the iron powder is analyzed by a fluorescent X-ray, followed by making evaluation according to the following criteria.

—Evaluation Criteria (Detachment Properties)—

A: A transfer amount of silica from the resin particle into the iron powder is less than 5% by mass.

B: A transfer amount of silica from the resin particle into the iron powder is 5% by mass or more and less than 10% by mass.

C: A transfer amount of silica from the resin particle into the iron powder is 10% by mass or more.

(Evaluation of Fluidity of Resin Particle after Applying Mechanical Load)

Fluidity (keeping properties of fluidity) of the silica particles after applying a mechanical load to the resin particle is evaluated. Specifically, the evaluation is performed as follows.

5 g of the resin particle (1) and 200 g of a 100-μm iron powder are charged in a glass bottle and mixed for 60 minutes by a tumbler shaker, and the iron powder is then removed by a sieve having a pore size of 75 μm. Thereafter, 2 g of the resin particle (1) having passed through the sieve is placed on a sieve of 45 μm and vibrated in a vibration width of 1 mm for 90 seconds. The behavior of dropping of the resin particle (1) is observed, thereby making evaluation according to the following criteria.

Degree of aggregation(%)=(Mass on 45-μm net(g))÷2×100

—Evaluation Criteria (Fluidity)—

A: The degree of aggregation is less than 20%.

B: The degree of aggregation is 20% or more and less than 50%.

C: The degree of aggregation is 50% or more.

Preparation conditions, physical properties and evaluation results of the hydrophobic silica particles (1) and the resin particle (1) are shown in Tables 1 and 2.

Examples 2 to 6 and Comparative Examples 1 to 7

(Preparation of Silica Particles)

Alkaline catalyst solutions (2) to (6) and alkaline catalyst solutions (101) to (107) are prepared in the same manner, except that in the preparation of the alkaline catalyst solution (1), "50 g" of the 10% ammonia water is changed to an amount shown in the column of "Mass (g)" of "10% ammonia water" of "Components to be added" in Table 1.

Each catalyst amount, i.e., the $NH_3$ amount in each of the foregoing alkaline catalyst solutions (2) to (6) and alkaline catalyst solutions (101) to (107) after the preparation is shown in the column of "$NH_3$ amount [mol/L]" of "10% ammonia water" of "Components to be added" in Table 1.

Subsequently, it is attempted to prepare silica particles suspensions (2) to (6) and silica particles suspension (101) to (107) in the same manner, except that in the preparation of the silica particles suspension (1), each of the alkaline catalyst solutions (2) to (6) or the alkaline catalyst solutions (101) to (107) is used in place of the alkaline catalyst solution (1), and the amount and supply amount of the tetramethoxysilane to be added to the alkaline catalyst solution and the catalyst concentration, amount and supply amount of the ammonia water to be added to the alkaline catalyst solution are changed to amounts shown in Table 1.

Specifically, with respect to the amount and supply amount of the tetramethoxysilane to be added to the alkaline catalyst solution, the amount "450 g" of the tetramethoxysilane is changed to an amount shown in the column of "Mass (g)" of "TMOS" of "Total addition amount" in Table 1, and the supply amount "9 g/min" of the tetramethoxysilane is changed to an amount shown in the column of "TMOS" of "Supply amount [g/min]" in Table 1.

With respect to the catalyst concentration, amount and supply amount of the ammonia water to be added to the alkaline catalyst solution, the catalyst amount of ammonia water "4.44%" is changed to an amount shown in the column of "$NH_3$ concentration [%]" of "Ammonia water" of "Total addition amount" in Table 1, and the supply amount of ammonia water "5.4 g/min" is changed to an amount shown in the column of "Ammonia amount" of "Supply amount [g/min]" in Table 1.

Here, the amount that is the supply amount of the ammonia catalyst into each of the alkaline catalyst solutions (2) to (6) and the alkaline catalyst solutions (101) to (107) and which is an amount per mole of the total supply amount of the tetraalkoxysilane to be supplied per minute is shown in the column of "$NH_3$ amount [mole/min] (vs. TMOS)" of "Relative amount" in Table 1.

Also, the amount that is the supply amount of the tetraalkoxysilane (TMOS) into each of the alkaline catalyst solutions (2) to (6) and the alkaline catalyst solutions (101) to (107) and which is an amount per mole of methanol in each of the alkaline catalyst solutions (2) to (6) and the alkaline catalyst solutions (101) to (107) is shown in the column "TMOS amount [mol/(mol·min)] (vs. methanol)" of "Relative amount" in Table 1.

With respect to each of the resulting silica particles suspensions (2) to (6) and the silica particles suspensions (101) to (104) and (107), the solvent is distilled off, and the residue is dried in the same manner as in the silica particles suspension (1), thereby obtaining hydrophilic silica particles (2) to (6) and hydrophilic silica particles (101) to (107).

Incidentally, with respect to the silica particles suspension (105) of Comparative Example 5 and the silica particles suspension (106) of Comparative Example 6, the liquid form becomes gelled during the silica particles forming step, so that no hydrophilic silica particles are obtained.

Furthermore, each of the hydrophilic silica particles (2) to (5) and the hydrophilic silica particles (101) to (104) and (107) are subjected to a hydrophobic treatment in the same manner as in Example 1, thereby obtaining hydrophobic silica particles (2) to (5) and hydrophobic silica particles (101) to (104) and (107).

Each of the resulting hydrophobic silica particles (2) to (5) and hydrophobic silica particles (101) to (104) and (107) and the hydrophilic silica particles (6) are observed through SEM photography in the same manner as in the hydrophobic silica particles (1) and subjected to image analysis. A volume average particle diameter ($D_{50v}$), a particle size distribution index and an average circularity [100/SF2] of each of the primary particles obtained by the image analysis are shown in the column of "Characteristic features of primary particles" in Table 2.

Also, distinction of hydrophobicity and hydrophilicity and shape of the resulting silica particles are shown in the column of "Hydrophilicity or hydrophobicity and shape" of "Characteristic features of primary particles" in Table 2. The hydrophobic heterogeneity shows that the silica particles are hydrophobic silica particles in a heterogeneous shape; the hydrophilic heterogeneity shows that the silica particles are hydrophilic silica particles in a heterogeneous shape; and the hydrophobic sphere shows that the silica particles are hydrophobic silica particles in a spherical shape.

In each of the resulting hydrophobic silica particles (2) to (5) and hydrophobic silica particles (101) to (104) and (107) and the hydrophilic silica particles (6), a proportion of particles of 100 primary particles of each of the silica particles having been subjected to SEM photography, which are satisfied with the expression (1), is shown in the column of "Proportion" of "Expression (1)" of "Characteristic features of primary particles" in Table 2. Incidentally, a unit of the numerical value in the column of "Proportion" is "% by number".

With respect to the 100 primary particles of each of the silica particles having been subjected to SEM photography, α and β of a regression line obtained from plotted points by taking the circularity on the ordinate and the volume average particle diameter on the abscissa, respectively are shown in the column of "α" and the column "β" of "Regression line" in Table 2.

(Preparation of Resin Particle)

Resin particles (2) to (6) of Examples 2 to 6 and resin particles (101) to (104) and (107) of Comparative Examples 1 to 4 and 7 are produced in the same manner as in the preparation of the resin particle (1) of Example 1, except that the hydrophobic silica particles (1) are replaced by the hydrophobic silica particles (2) to (5), the hydrophilic silica particles (6) and the hydrophobic silica particles (101) to (104) and (107), respectively.

Each of the resulting resin particles (2) to (6) of Examples 2 to 6 and resin particles (101) to (104) and (107) is evaluated in the same manners as in the resin particle (1). The evaluation results are shown in Table 2.

Examples 7 and 8

Resin particle main bodies (2) and (3) having a volume average particle diameter of 2 μm and 20 μm, respectively are produced in the same manner as in the preparation of the resin mother particle (1), except that a cut point of the elbow type classifier is changed.

Resin particles (7) and (8) are produced in the same manner as in Example 1, except that in the preparation of the resin particle (1), the resin mother particle (1) is replaced by the resin particle main bodies (2) and (3), respectively.

Each of the resulting resin particles (7) and (8) is evaluated in the same manner as in the resin particle (1). The evaluation results are shown in Table 2.

Example 9

100 g of thoroughly dehydrated polyoxytetramethylene glycol (OH value: 55, acid value: 1) and 12 g of 1,4-butanediol are kneaded using a three-roll mill, thereby obtaining a liquid kneaded material. Subsequently, the liquid kneaded material is heated at 90° C., and 4,4'-diphenylmethane diisocyanate is heated at 60° C. The both are continuously sent to a mixer at supply rates of 100 g/min for the liquid kneaded material and 20 g/min for the isocyanate compound, respectively by using respective gear pumps and quickly stirred. Thereafter, the resulting mixture is introduced into a twin-screw extruder and subjected to a polymerization kneading reaction under a condition at a screw rotation rate of 350 rpm and at 200° C., thereby producing a polyurethane resin (mother resin (2)).

A resin mother particle (4) having a volume average particle diameter of 7 μm is obtained in the same manner, except that in the preparation of the mother resin (1), the mother resin (1) (amorphous polyester resin) is replaced by the resulting mother resin (2).

A resin particle (9) is produced in the same manner as in Example 1, except that in the preparation of the resin particle (1), the resin mother particle (1) is replaced by the resin mother particle (4).

The resulting resin particle (9) is evaluated in the same manner as in the resin particle (1). The evaluation results are shown in Table 2.

Example 10

In a reaction vessel, 3.8 L of cyclohexane, 20 cc of tetrahydrofuran and 14 mol of a styrene monomer are charged, and 0.07 mol of n-butyllithium is further charged. Thereafter, the mixture is allowed to react at a reaction temperature of 50° C. for 5 minutes, thereby preparing a prepolymer solution. To this solution, 6 mol of a styrene monomer is added, and 0.02 mol of n-butyllithium is further thrown. The mixture is allowed to react at 80° C. for 10 minutes, and methanol is then added to this reaction solution to terminate the reaction. Subsequently, the solvent is distilled off under reduced pressure, and the residue is dried to produce a polystyrene resin (mother resin (3)).

A resin mother particle (5) having a volume average particle diameter of 7 μm is obtained in the same manner, except that in the preparation of the mother resin (1), the mother resin (1) (amorphous polyester resin) is replaced by the mother resin (3).

A resin particle (10) is produced in the same manner as in Example 1, except that in the preparation of the resin particle (1), the resin mother particle (1) is replaced by the resin mother particle (5).

The resulting resin particle (10) is evaluated in the same manner as in the resin particle (1). The evaluation results are shown in Table 2.

Examples 11 and 12

Resin particles (11) and (12) are produced in the same manner as in Example 1, except that in the preparation of the resin particle (1), the addition amount of the hydrophobic silica particles (1) relative to the resin mother particle (1) is changed, thereby replacing the addition amount by an amount shown in the column of "Coverage [%]" of "Silica particles" of "Particle attaching step" in Table 1.

Each of the resulting resin particles (11) and (12) is evaluated in the same manner as in the resin particle (1). The evaluation results are shown in Table 2.

TABLE 1

| | Preparing step | | | Particle forming step | | | | |
| | Components to be added | | | Total addition amount | | | Supply amount | |
| | | 10% ammonia water | | | Ammonia water | | [g/min] | |
| | Methanol Mass [g] | Mass [g] | NH$_3$ amount [mole/L] | TMOS Mass [g] | Mass [g] | NH$_3$ concentration [%] | TMOS | Ammonia water |
|---|---|---|---|---|---|---|---|---|
| Ex. 1 | 300 | 50 | 0.68 | 450 | 270 | 4.44 | 9 | 5.4 |
| Ex. 2 | 300 | 54 | 0.73 | 550 | 285 | 4.74 | 11 | 5.7 |
| Ex. 3 | 300 | 56 | 0.75 | 600 | 270 | 4.44 | 12 | 5.4 |
| Ex. 4 | 300 | 52 | 0.71 | 500 | 290 | 4.14 | 9.1 | 5.3 |
| Ex. 5 | 300 | 49 | 0.67 | 450 | 280 | 4.64 | 9 | 5.6 |
| Ex. 6 | 300 | 52 | 0.71 | 450 | 280 | 4.64 | 9 | 5.6 |
| Ex. 7 | 300 | 50 | 0.68 | 450 | 270 | 4.44 | 9 | 5.4 |
| Ex. 8 | 300 | 50 | 0.68 | 450 | 270 | 4.44 | 9 | 5.4 |
| Ex. 9 | 300 | 50 | 0.68 | 450 | 270 | 4.44 | 9 | 5.4 |
| Ex. 10 | 300 | 50 | 0.68 | 450 | 270 | 4.44 | 9 | 5.4 |
| Ex. 11 | 300 | 50 | 0.68 | 450 | 270 | 4.44 | 9 | 5.4 |
| Ex. 12 | 300 | 50 | 0.68 | 450 | 270 | 4.44 | 9 | 5.4 |
| Comp. Ex. 1 | 300 | 52 | 0.71 | 450 | 270 | 4.44 | 4.5 | 2.7 |
| Comp. Ex. 2 | 300 | 55 | 0.74 | 700 | 310 | 4.52 | 14 | 6.2 |
| Comp. Ex. 3 | 300 | 90 | 1.12 | 500 | 330 | 7.58 | 10 | 6.6 |
| Comp. Ex. 4 | 300 | 70 | 0.91 | 500 | 310 | 7.42 | 11.1 | 6.9 |
| Comp. Ex. 5 | 300 | 35 | 0.5 | 450 | 270 | 4.44 | 4.5 | 5.4 |
| Comp. Ex. 6 | 300 | 45 | 0.62 | 450 | 100 | 4.44 | 9 | 2 |
| Comp. Ex. 7 | 300 | 50 | 0.68 | 450 | 270 | 4.44 | 7.1 | 4.3 |

| | Particle forming step | | | Particle attaching step | | | |
| | Supply amount (relative amount) | | | | Mother resin | | |
| | NH$_3$ amount [mole/min] (vs. TMOS) | TMOS amount [mole/(mole · min)] (vs. methanol) | Silica particles No. | Particle No. | Kind | Particle diameter [μm] | Silica particles Coverage [%] |
|---|---|---|---|---|---|---|---|
| Ex. 1 | 0.24 | 0.0063 | 1 | 1 | Polyester | 7 | 50 |
| Ex. 2 | 0.22 | 0.0077 | 2 | 1 | Polyester | 7 | 50 |
| Ex. 3 | 0.18 | 0.0084 | 3 | 1 | Polyester | 7 | 50 |
| Ex. 4 | 0.21 | 0.0064 | 4 | 1 | Polyester | 7 | 50 |
| Ex. 5 | 0.26 | 0.0063 | 5 | 1 | Polyester | 7 | 50 |
| Ex. 6 | 0.26 | 0.0063 | 6 | 1 | Polyester | 7 | 50 |
| Ex. 7 | 0.24 | 0.0063 | 1 | 2 | Polyester | 2 | 50 |
| Ex. 8 | 0.24 | 0.0063 | 1 | 3 | Polyester | 20 | 50 |
| Ex. 9 | 0.24 | 0.0063 | 1 | 4 | Polyurethane | 7 | 50 |
| Ex. 10 | 0.24 | 0.0063 | 1 | 5 | Polystyrene | 7 | 50 |
| Ex. 11 | 0.24 | 0.0063 | 1 | 1 | Polyester | 7 | 10 |
| Ex. 12 | 0.24 | 0.0063 | 1 | 1 | Polyester | 7 | 75 |
| Comp. Ex. 1 | 0.24 | 0.0032 | 101 | 1 | Polyester | 7 | 50 |
| Comp. Ex. 2 | 0.18 | 0.0098 | 102 | 1 | Polyester | 7 | 50 |
| Comp. Ex. 3 | 0.45 | 0.007 | 103 | 1 | Polyester | 7 | 50 |
| Comp. Ex. 4 | 0.41 | 0.0078 | 104 | 1 | Polyester | 7 | 50 |
| Comp. Ex. 5 | 0.24 | 0.0032 | — | — | — | — | — |
| Comp. Ex. 6 | 0.09 | 0.0063 | — | — | — | — | — |
| Comp. Ex. 7 | 0.24 | 0.005 | 107 | 1 | Polyester | 7 | 50 |

TABLE 2

Characteristic features of primary particles of silica particles

| | Particle size $D_{50v}$ [nm] | Particle size distribution | Average circularity [100/SF2] | Hydrophilicity or hydrophobicity and shape | Expression (1) Proportion | Regression line α | Regression line β |
|---|---|---|---|---|---|---|---|
| Ex. 1 | 180 | 1.52 | 0.58 | Hydrophobic heterogeneity | 99 | −2.1 | 1.1 |
| Ex. 2 | 320 | 1.65 | 0.65 | Hydrophobic heterogeneity | 100 | −2.4 | 1 |
| Ex. 3 | 430 | 1.73 | 0.78 | Hydrophobic heterogeneity | 99 | −1.8 | 0.95 |
| Ex. 4 | 240 | 1.6 | 0.71 | Hydrophobic heterogeneity | 98 | −2 | 0.9 |
| Ex. 5 | 130 | 1.46 | 0.82 | Hydrophobic heterogeneity | 97 | −1.2 | 1.15 |
| Ex. 6 | 190 | 1.42 | 0.82 | Hydrophilic heterogeneity | 96 | −0.95 | 0.85 |
| Ex. 7 | 180 | 1.52 | 0.58 | Hydrophobic heterogeneity | 99 | −2.1 | 1.1 |
| Ex. 8 | 180 | 1.52 | 0.58 | Hydrophobic heterogeneity | 99 | −2.1 | 1.1 |
| Ex. 9 | 180 | 1.52 | 0.58 | Hydrophobic heterogeneity | 99 | −2.1 | 1.1 |
| Ex. 10 | 180 | 1.52 | 0.58 | Hydrophobic heterogeneity | 99 | −2.1 | 1.1 |
| Ex. 11 | 180 | 1.52 | 0.58 | Hydrophobic heterogeneity | 99 | −2.1 | 1.1 |
| Ex. 12 | 180 | 1.52 | 0.58 | Hydrophobic heterogeneity | 99 | −2.1 | 1.1 |
| Comp. Ex. 1 | 250 | 1.25 | 0.83 | Hydrophobic heterogeneity | 96 | −2.2 | 1 |
| Comp. Ex. 2 | 420 | 2.2 | 0.84 | Hydrophobic heterogeneity | 85 | −0.7 | 0.75 |
| Comp. Ex. 3 | 600 | 1.5 | 0.94 | Hydrophobic sphere | 60 | −0.8 | 1.1 |
| Comp. Ex. 4 | 300 | 1.6 | 0.93 | Hydrophobic sphere | 75 | −3 | 1.4 |
| Comp. Ex. 5 | Gel form | — | — | — | — | — | — |
| Comp. Ex. 6 | Gel form | — | — | — | — | — | — |
| Comp. Ex. 7 | 200 | 1.3 | 0.82 | Hydrophobic heterogeneity | 97 | −2 | 1.1 |

| | Silica particles No. | Resin mother particle No. | No. | Dispersibility | Embedding properties | Detachment properties | Fluidity |
|---|---|---|---|---|---|---|---|
| Ex. 1 | 1 | 1 | 1 | A | A | A | A |
| Ex. 2 | 2 | 1 | 2 | A | A | A | A |
| Ex. 3 | 3 | 1 | 3 | A | A | A | A |
| Ex. 4 | 4 | 1 | 4 | A | A | A | A |
| Ex. 5 | 5 | 1 | 5 | A | A | A | A |
| Ex. 6 | 6 | 1 | 6 | B | A | A | A |
| Ex. 7 | 1 | 2 | 7 | A | A | A | A |
| Ex. 8 | 1 | 3 | 8 | A | A | A | A |
| Ex. 9 | 1 | 4 | 9 | A | A | A | A |
| Ex. 10 | 1 | 5 | 10 | A | A | A | A |
| Ex. 11 | 1 | 1 | 11 | A | A | A | A |
| Ex. 12 | 1 | 1 | 12 | A | A | A | A |
| Comp. Ex. 1 | 101 | 1 | 101 | A | C | A | B |
| Comp. Ex. 2 | 102 | 1 | 102 | C | A | C | B |
| Comp. Ex. 3 | 103 | 1 | 103 | B | B | C | B |
| Comp. Ex. 4 | 104 | 1 | 104 | B | C | B | B |
| Comp. Ex. 5 | — | — | — | — | — | — | — |
| Comp. Ex. 6 | — | — | — | — | — | — | — |
| Comp. Ex. 7 | 107 | 1 | 107 | A | C | A | B |

As is noted from Table 1, similar to the resin particle (1), in all of the resin particles (2) to (12), the shape of the silica particles external added onto the surface thereof is a heterogeneous shape; excellent strength is revealed; and even in the case of applying a mechanical load to the resin particle, fluidity is kept. Furthermore, all of the resin particles (1) to (12) are also excellent in dispersibility, embedding properties and detachment properties of the silica particles.

In Comparative Examples 5 and 6, the dispersion liquids are gelled during the silica particles forming step, so that no silica particles are obtained. For that reason, the symbol "-" is marked in each of the columns of "Characteristic features of primary particles of silica particles" and "Evaluation of resin particle" in Table 2.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:
1. A method for producing a resin particle comprising:
preparing an alkaline catalyst solution containing a first alkaline catalyst in a concentration of from 0.6 mol/L to 0.85 mol/L in an alcohol-containing solvent;
supplying a tetraalkoxysilane in a supply amount of from 0.006 mol/(mol·min) to 0.009 mol/(mol·min) relative to the alcohol into the alkaline catalyst solution and also supplying a second alkaline catalyst in an amount of from 0.1 mol to 0.4 mol per mole of the total supply amount of the tetraalkoxysilane supplied per minute to obtain silica particles; and
externally adding the obtained silica particles onto the surface of a resin mother particle.
2. The method for producing the resin particle according to claim 1,
wherein each of the first alkaline catalyst and the second alkaline catalyst is selected from the group consisting of an ammonia, an urea, a monoamine, and a quaternary ammonium salt.

3. The method for producing the resin particle according to claim 1,
wherein the alkaline catalyst solution is prepared so that the concentration of the first alkaline catalyst is from 0.63 mol/L to 0.78 mol/L.

4. The method for producing the resin particle according to claim 1,
wherein the tetraalkoxysilane is selected from the group consisting of a tetramethoxysilane, a tetraethoxysilane, a tetrapropoxysilane and a tetrabutoxysilane.

5. The method for producing the resin particle according to claim 1,
wherein the supply amount of the tetraalkoxysilane is from 0.0065 mol/(mol·min) to 0.0085 mol/(mol·min) relative to the alcohol in the alkaline catalyst solution.

6. The method for producing the resin particle according to claim 1,
wherein the supply amount of the tetraalkoxysilane is from 0.0070 mol/(mol·min) to 0.0080 mol/(mol·min) relative to the alcohol in the alkaline catalyst solution.

7. The method for producing the resin particle according to claim 1,
wherein a temperature in the alkaline catalyst solution at the time of supplying the tetraalkoxysilane is from 5° C. to 50° C.

8. The method for producing the resin particle according to claim 1, further comprising:
treating a surface of the silica particles a hydrophobic treatment agent.

9. The method for producing the resin particle according to claim 1,
wherein the first and second alkaline catalysts are the same.

10. The method for producing the resin particle according to claim 1,
wherein primary particles of the obtained silica particles have (i) a volume average particle diameter of from 100 nm to 500 nm, (ii) a particle size distribution index of from 1.40 to 1.80, (iii) an average circularity of from 0.5 to 0.85, and (iv) satisfy a regression line expressed by following expression (1) with respect to the circularity and the volume average particle diameter (nm):

$$\text{Circularity} = \alpha \times (\text{Volume average particle diameter})/1000 + \beta \quad (1),$$

where $\alpha$ is from −2.5 to −0.9, and $\beta$ is from 0.8 to 1.2.

11. The method for producing the resin particle according to claim 10,
wherein the volume average particle diameter of the primary particles of the silica particles is from 100 nm to 350 nm.

12. The method for producing the resin particle according to claim 10,
wherein the volume average particle diameter of the primary particles of the silica particles is from 100 nm to 250 nm.

13. The method for producing the resin particle according to claim 10,
wherein the particle size distribution index of the primary particles of the silica particles is from 1.45 to 1.75.

14. The method for producing the resin particle according to claim 10,
wherein the average circularity of the primary particles of the silica particles is from 0.6 to 0.8.

15. The method for producing the resin particle according to claim 10,
wherein $\alpha$ is from −2.0 to −1.0, and $\beta$ is from 0.9 to 1.1.

16. The method for producing the resin particle according to claim 10,
wherein a coverage of the silica particles externally added onto the surface of the resin mother particle relative to the surface area of the resin mother particle, which is obtained by the following formula (i), is 5% to 80%:

$$(\sqrt{3} \times B \times C \times D/(2 \times \pi \times F \times E \times 0.001 \times A)) \times 100 \quad (i),$$

where:
A represents an addition amount of the resin mother particle expressed in "g" as the unit;
B represents a specific gravity of the resin mother particle expressed in "g/cm$^3$" as the unit;
C represents a volume average particle diameter of the resin mother particle expressed in "μm" as the unit;
D represents an addition amount of the silica particles expressed in "g" as the unit;
E represents a specific gravity of the silica particles expressed in "g/cm$^3$" as the unit; and
F represents a volume average particle diameter of the silica particles expressed in "nm" as the unit.

* * * * *